Oct. 29, 1929.  W. P. HANNAHS  1,733,457
BALL AND SOCKET JOINT AND PACKING
Filed Aug. 24, 1927
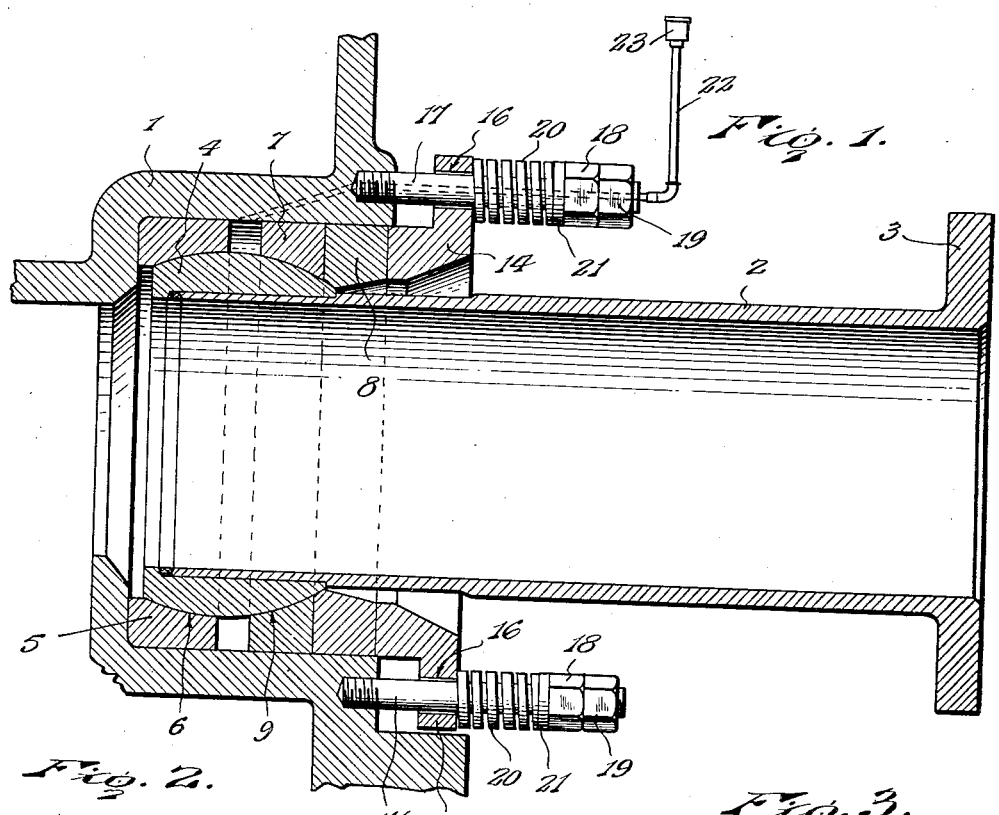
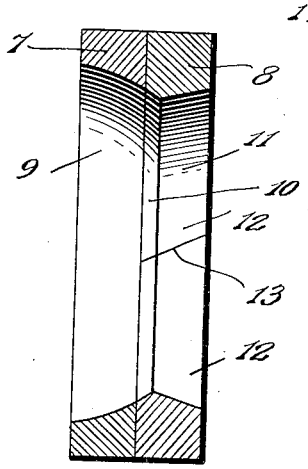
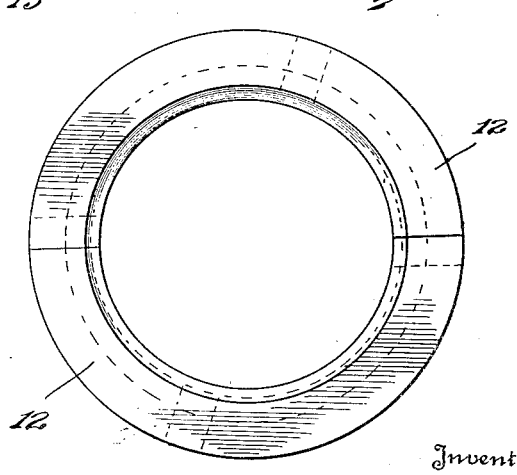
Inventor
W. P. Hannahs.
By
Attorney Patented Oct. 29, 1929

1,733,457

UNITED STATES PATENT OFFICE

WILLIAM P. HANNAHS, OF IRONTON, OHIO

BALL-AND-SOCKET JOINT AND PACKING

Application filed August 24, 1927. Serial No. 215,205.

This invention relates to pipe joints and more particularly to a ball and socket joint packed to prevent escape of steam. The joint is particularly intended for use to connect a steam pipe leading from the front cylinders or unit of a locomotive engine to the rear cylinders or unit. The pipe moves with the front unit of the locomotive and it has previously been found difficult to tightly pack the rear end of the pipe in its socket forming part of the rear unit and prevent steam from escaping when the pipe moves due to a locomotive passing around a curve in a track.

Therefore, one object of the invention is to provide a ball and socket joint for the rear end of the steam pipe packed in such a manner that the pipe may move freely without steam escaping.

Another object of the invention is to provide the joint with contracting inner and outer packing rings formed of a metal alloy having a melting point higher than the temperature of steam which passes through the pipe and joint and to so form the packing rings that they will be snugly received in the socket and have close contacting engagement with a semi-spherical head carried by the end of the pipe received in the socket.

Another object of the invention is to force the packing rings into the socket tightly about the head of the pipe by means of an outer retainer ring acted upon by springs bearing against abutment nuts which may be adjusted to control tension of the springs and thereby regulate the pressure exerted against the packing rings.

The improved packed joint is illustrated in the accompanying drawing, wherein

Figure 1 is a longitudinal sectional view through the joint;

Fig. 2 is a view showing the packing rings in section, and

Fig. 3 is a view looking at the outer end of the outer packing ring.

The socket, which is indicated in general by the numeral 1, forms a part of the rear unit of a locomotive and the pipe 2 has its forward end provided with a flange 3 to be secured to a front unit of a locomotive and its rear end received in the socket 1. A head 4 is carried by the rear end portion of the pipe 2 within the socket 1 and constitutes a portion of a sphere. At the inner end of the socket is disposed an inner retainer ring 5 which is formed of any suitable metal and has its inner circumferential surface or wall 6 arcuate in cross section to conform to the curvature of the head 4. Packing rings 7 and 8 fit into the outer portion of the socket about the pipe 2 and the outer portion of the head, and these packing rings fit snugly into the socket. The inner circumferential wall or surface 9 of the inner packing ring 7 is concaved throughout its circumference and arcuate in cross section for close fitting engagement with the head of the pipe and the outer ring has an arcuate surface 10 forming a continuation of the arcuate surface 9. From the arcuate portion 10, the inner circumferential wall 11 of the outer packing ring flares outwardly so that when a locomotive is passing around a curve in a track the pipe 2 may have swinging movement with its semi-spherical head turning in the socket. In the preferred form the outer ring consists of companion sections 12 having contacting ends cut at an angle and overlapping, as shown at 13. These rings 7 and 8 are formed of metal and preferably consist of an alloy fifty per cent copper and fifty per cent lead. After the lead and copper have been melted and intermingled the molten metal is poured into molds and suitably finished to provide smooth surfaces after being removed from the mold.

Pressure must be applied to the packing rings in order to force them inwardly into tight binding engagement with the pipe head and in order to do so I employ an outer retainer ring 14 which is of an external diameter to be snugly received in the socket and at its outer end carries a flange 15 formed with openings 16 through which pass pins 17. The pins 17 are threaded into the outer end of the socket 1 and have threaded outer end portions carrying nuts 18 and 19. Springs 20 are disposed about the pins between the flange 15 and washers 21 engageable by the nuts 18, and from an inspection of Fig. 1 it will be readily seen that when the nuts 18 are tightened to place the springs under desired tension and the nuts 19 tightened to lock the nuts 18 the springs will exert pressure to force the outer retainer ring 14 inwardly with respect to the socket 1 and apply pressure to the packing rings which will urge these rings inwardly into close contacting engagement with the head of the pipe. Therefore, a very tight joint will be formed about the head of the pipe and there will be no danger of steam escaping. In view of the fact that the melting point of the alloy employed to form the packing rings is higher than the temperature of the live steam, there will be no danger of the packing being melted by the heat of the steam. When it is necessary to repair the joint, the securing nuts are removed thereby releasing the outer retainer ring and permitting it to be moved outwardly and the packing rings removed and new ones inserted. Since the inner packing ring is spaced from the inner retainer ring, a wedging action will take place between the packing ring and the head of the pipe and a very tight joint formed. It will be noted that initially the inner packing ring 7 is appreciably forward from the inner retaining ring 5, leaving a free open space, so that a considerable range of adjustment of the packing rings is provided. As the packing rings wear, the nuts 18, 19 are turned further home so that the packing rings will be driven inwardly to fit closely to the head 4, and this action may be repeated until the ring 7 impinges against the ring 5, whereupon no further adjustment is permissible and new packing rings must be supplied. Owing, however, to the wide range of adjustment which is permitted, the life of the packing rings is prolonged and the cost of maintenance is reduced.

A pipe 22 having an oil cup 23 at its outer end communicates with a passage 24 drilled in the wall of the socket so that oil may be forced into the socket between the inner packing ring 7 and inner retainer ring 5.

Having thus described the invention, I claim:

1. A packing for a ball and socket joint consisting of inner and outer split packing rings both fitting closely within the socket of the joint with their opposed ends in contact throughout their area and the splits in the two rings being staggered, the inner packing ring having its inner annular wall arcuately concaved for its full depth and the outer packing ring having its inner annular wall constituting a continuation of the arcuate wall of the inner ring for a portion of its depth whereby both rings may fit to the ball of the joint, the outer portion of the inner wall of the outer ring flaring outwardly.

2. In a ball and socket joint, a socket, an inner retainer ring seated in the base of said socket and having a concave inner annular surface arcuate in cross section, a pipe having an end portion received in said socket, a semispherical head on said end portion of the pipe bearing against the concaved surface of said ring, inner and outer packing rings fitting snugly in said socket with their opposed ends in contact throughout their areas and having their inner circumferences fitted to and bearing against said head, there being a free space between the inner retaining ring and the inner packing ring, an outer retainer ring fitting snugly within the socket with its inner end and the outer end of the outer packing ring in contact throughout their areas, said outer retaining ring having a flange overhanging the walls of the socket, and having its inner circumference spaced throughout its extent from the pipe and the head thereon and flared outwardly, and means on its flange to retain the outer retainer ring in pressing engagement with the outer packing ring, and adjust the packing rings to compensate for wear, and means associated with the last-mentioned means to supply lubricant to the free space between the inner retainer ring and the inner packing ring.

In testimony whereof I affix my signature.

WILLIAM P. HANNAHS. [L. S.]